(12) United States Patent
Koda (10) Patent No.: US 8,941,611 B2
(45) Date of Patent: Jan. 27, 2015

(54) PORTABLE TERMINAL, DISPLAY CONTROL PROGRAM AND DISPLAY CONTROL METHOD

(75) Inventor: Hideki Koda, Nagaokakyo (JP)

(73) Assignee: KYOCERA Corporation, Kyoto (JP)

( * ) Notice: Subject to any disclaimer, the term of this patent is extended or adjusted under 35 U.S.C. 154(b) by 294 days.

(21) Appl. No.: 13/637,354

(22) PCT Filed: Mar. 18, 2011

(86) PCT No.: PCT/JP2011/001605
§ 371 (c)(1),
(2), (4) Date: Sep. 25, 2012

(87) PCT Pub. No.: WO2011/118175
PCT Pub. Date: Sep. 29, 2011

(65) Prior Publication Data
US 2013/0009904 A1    Jan. 10, 2013

(30) Foreign Application Priority Data

Mar. 26, 2010  (JP) .................................. 2010-072545

(51) Int. Cl.
*G06F 3/041* (2006.01)
*H04M 1/02* (2006.01)
*G06F 1/16* (2006.01)
*G06F 3/0485* (2013.01)
*G06F 3/0488* (2013.01)

(52) U.S. Cl.
CPC ............. *H04M 1/022* (2013.01); *G06F 1/1641* (2013.01); *G06F 3/0485* (2013.01); *G06F 3/04883* (2013.01); *H04M 1/0212* (2013.01); *G06F 1/1615* (2013.01); *G06F 1/162* (2013.01); *G06F 1/1624* (2013.01); *H04M 2250/16* (2013.01); *H04M 2250/22* (2013.01)
USPC .......................... 345/173; 345/156; 345/619

(58) Field of Classification Search
USPC ......................... 345/173, 156, 619
See application file for complete search history.

(56) References Cited

U.S. PATENT DOCUMENTS

2011/0102455 A1* 5/2011 Temple .......................... 345/619
2011/0126097 A1* 5/2011 Isono ............................. 715/702

FOREIGN PATENT DOCUMENTS

| JP | H05-324640 A | 12/1993 |
| JP | H11-102274 A | 4/1999 |
| JP | 2002-351309 A | 12/2002 |
| JP | 2008-158975 A | 7/2008 |

OTHER PUBLICATIONS

International Search Report dated Jun. 21, 2011, issued for International Application No. PCT/JP2011/001605.

* cited by examiner

*Primary Examiner* — Abbas Abdulselam
*Assistant Examiner* — Shawna Stepp Jones
(74) *Attorney, Agent, or Firm* — Procopio, Cory, Hargreaves & Savitch LLP (57) ABSTRACT

A portable terminal comprising: a display displaying a first display item; and a touch panel displaying a second display item and detecting contact made thereon determines, when a first contact point and a second contact point are detected at different positions on the touch panel, whether the first contact point moves before release of one of the contact points and further determines whether a change in a relative position of the second contact point with respect to the first contact point, before and after the movement, is smaller than a predetermined amount. When determining affirmatively, the portable terminal specifies, according to a direction of the movement, a position on the display to which the first display item is to be moved and a position on the touch panel to which the second display item is to be moved and displays the display items at the specified positions.

9 Claims, 7 Drawing Sheets

| Manufacturer | Company A |
|---|---|
| Model | FD1a— |
| Dimensions | 4 |
| Weight | 8 |
| Maximum number of sheets | 150 |

| Manufacturer | Company B |
|---|---|
| Model | 101Pa |
| Dimensions | 446×3 |
| Weight | 9.0k |
| Maximum number of sheets | 120 |

FIG. 2B

| Dimensions | 4 |
| --- | --- |
| Weight | 8 |
| Maximum number of sheets | 150 |
| Colors | 5 colors |
| Duplex printing | ○ |
| Wireless LAN | ○ |

| Dimensions | 446×3 |
| --- | --- |
| Weight | 9.0k |
| Maximum number of sheets | 120 |
| Colors | 6 colors |
| Duplex printing | × |
| Wireless LAN | ○ |

PORTABLE TERMINAL, DISPLAY CONTROL PROGRAM AND DISPLAY CONTROL METHOD

TECHNICAL FIELD

The present invention relates to a portable terminal, such as a mobile phone, having a display and a touch panel, and in particular, to a technology for improving a user interface of a portable terminal.

BACKGROUND ART

Portable terminals, such as a mobile phone, provided with multiple displays are commonly known.

One conceivable form of displaying utilizing such multiple displays provided to a portable terminal is the synchronized displaying of items on multiple displays.

As one example of a technology for realizing synchronized displaying of items on multiple displays, the technology disclosed in Patent Literature 1 is known.

The display device disclosed in Patent Literature 1 displays a two-dimensional map and a three dimensional map on different ones of multiple touch panels (each including a display). When a user specifies a location on the two-dimensional map displayed on one touch panel, the display device displays, on the other touch panel, a three-dimensional map of the specified location taken from a viewpoint specified by the user.

CITATION LIST

Patent Literature

[Patent Literature 1]
Japanese Patent Application Publication No. 2002-351309

SUMMARY OF INVENTION

Technical Problem

In the meantime, cases are increasing where data having a great size are displayed on a portable terminal, such as a mobile phone, provided with a display having a comparatively small screen size. Here, data having a great size refers to, for instance, document data created on a personal computer or the like, the entirety of which cannot be displayed at once on a display having a comparatively small size as provided to a portable terminal.

When data having a great size as described above, which cannot be displayed at once on a display provided to a portable terminal, are actually displayed on a portable terminal, a user is commonly required to perform scroll operations so as to realize scroll-displaying of the data. However, this is problematic since the necessity of performing scroll operations leads to an increase in the burden placed upon the user.

In addition, a further increase is observed in the burden placed upon the user especially when data having a great size, which cannot be displayed at once on a display provided to a portable terminal, are to be displayed on each of the displays of a portable terminal provided with multiple displays. This is since, in such a case, the user is required to perform scroll operations with respect to each of the multiple displays in order to realize scroll-displaying of data on a corresponding display.

In view of such problems, the present invention provides a portable terminal provided with multiple display units, such as displays, that realizes a reduction in the burden placed upon the user resulting from the necessity of performing scroll operations with respect to each of the display units to realize scroll-displaying of data on a corresponding display unit.

Solution to Problem

One aspect of the present invention is a portable terminal that comprises: a display configured to display a display item; a touch panel configured to display a display item and to detect contact made thereon; a detection unit configured to detect a first contact point and a second contact point at different positions on the touch panel; a determination unit configured to, when the detection unit detects the first contact point and the second contact point, determine whether or not the first contact point moves before release of at least one of the first contact point and the second contact point, and further determine, only when determining that the first contact point has moved before release of at least one of the first contact point and the second contact point, whether or not a change in a relative position of the second contact point with respect to the first contact point, before and after the movement of the first contact point, is smaller than a predetermined amount; and a display control unit configured to, when the determination unit determines that the change in the relative position of the second contact point with respect to the first contact point, before and after the movement of the first contact point, is smaller than the predetermined amount, specify, according to a direction of the movement of the first contact point, a position on the display to which a first display item is to be moved and a position on the touch panel to which a second display item is to be moved, the first display item being displayed on the display prior to the movement of the first contact point and the second display item being displayed on the touch panel prior to the movement of the first contact point, and display the first display item at the position on the display to which the first display item is to be moved and display the second display item at the position on the touch panel to which the second display item is to be moved.

Advantageous Effects of Invention

With the above-described structure, the portable terminal pertaining to one aspect of the present invention reduces the burden placed upon the user resulting from the necessity of performing scroll operations with respect to each of the display units to realize scroll-displaying of data on a corresponding display unit.

DESCRIPTION OF EMBODIMENT

In the following, description is provided on a mobile phone as one form of implementation of the portable terminal pertaining to the present invention.

Embodiment

Device Structure

First, description is provided on a structure of a mobile phone 100 pertaining to the embodiment.

Figure 1A:
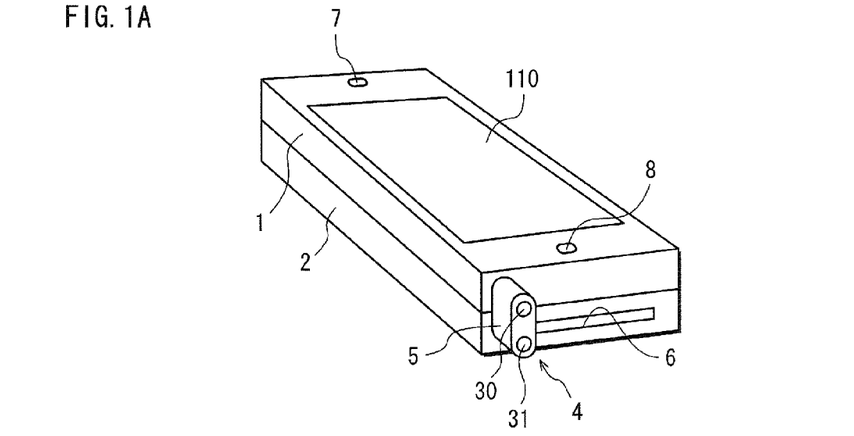
FIG. 1A illustrates an external appearance of a mobile phone 100 pertaining to the embodiment in a closed state thereof, and FIGS. 1B and 1C each illustrate an external appearance of the mobile phone 100 in an open state thereof.
Figure 1B:
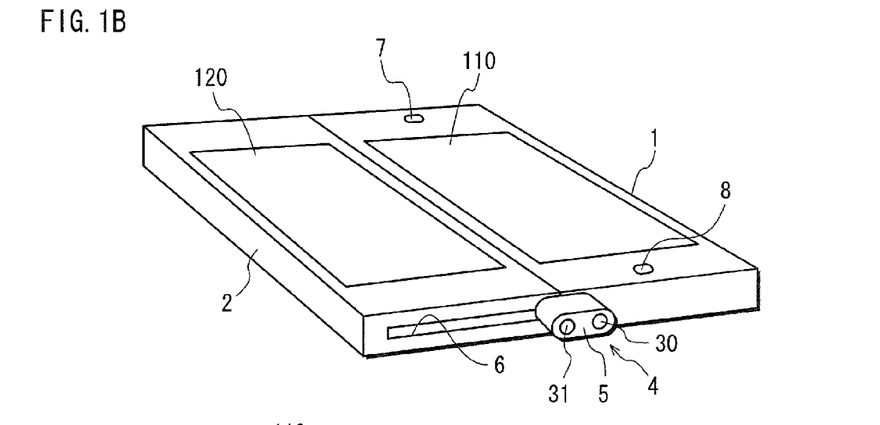
Figure 1C:
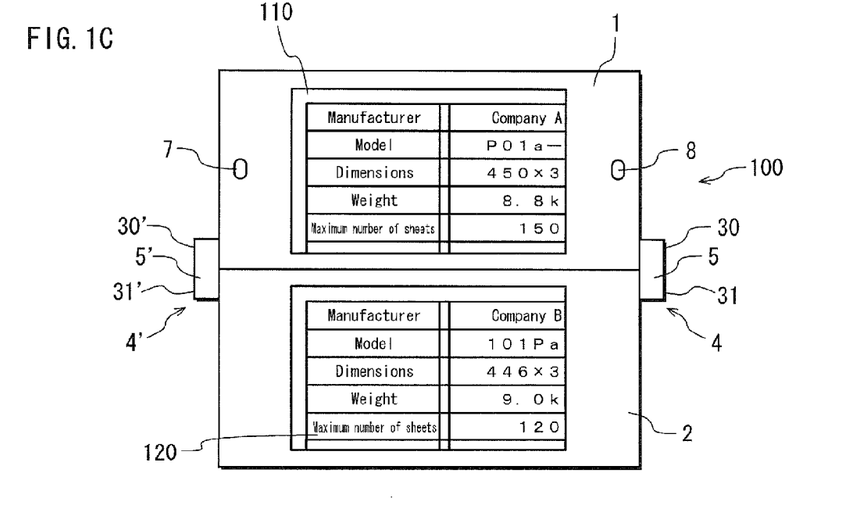

FIG. 1A is a perspective view illustrating an external appearance of the mobile phone 100 in a closed state thereof. FIG. 1B is a perspective view illustrating an external appearance of the mobile phone 100 in an open state thereof. FIG. 1C is a front elevational view illustrating an external appearance of the mobile phone 100 in the open state thereof.

As illustrated in FIGS. 1A through 1C, the mobile phone 100 is a slide-type terminal including a first housing 1, a second housing 2, and coupling mechanisms 4 and 4'. The first housing 1 and the second housing 2 are movable relative to each other. The coupling mechanisms 4 and 4' couple the first housing 1 and the second housing 2 together.

The first housing 1 includes a touch panel 110, a speaker 7, and a microphone 8. The second housing 2 includes a touch panel 120.

As illustrated in FIGS. 1A and 1B, a guide groove 6 is formed in a lateral side of the second housing 2 on which the coupling mechanism 4 is provided. Similarly, another guide groove is formed in the other lateral side of the second housing 2 on which the coupling mechanism 4' is provided.

Further, as illustrated in FIGS. 1A and 1B, the coupling mechanism 4 has a coupling piece 5 and pins 30 and 31 for coupling a lateral side of the first housing 1 and the lateral side of the second housing 2 on which the coupling mechanism 4 is provided. Similarly, the coupling mechanism 4' has a coupling piece 5' and pins 30' and 31' as illustrated in FIG. 1C.

Each of the pins 30 and 30' is pivotally supported by the first housing 1. Each of the pins 31 and 31' engages with a corresponding guide groove. By each of the pins 31 and 31' sliding along the corresponding guide groove, the first housing 1 and the second housing 2 move relative to each other.

As illustrated in FIG. 1A, when the mobile phone 100 is in a closed state, the touch panel 120 cannot be seen from the outside due to the first housing 1 being placed on top of the second housing 2. By each of the pins 31 and 31' of the respective coupling mechanism 4 and 4' sliding along a corresponding guide groove, the first housing 1 moves along a surface of the second housing 2. Then, by the pins 30 and 30' respectively rotating about the pins 31 and 31', the mobile phone 100 is switched to an open state in which a surface of the first housing 1 and the surface of the second housing 2 lie in approximately the same plane, as illustrated in FIGS. 1B and 1C. When the mobile phone 100 is in the open state, the touch panels 110 and 120 can be seen from the outside.

<Display Example>

Subsequently, description is provided on an example of an operation (referred to hereinafter as a "synchronized scroll operation") for scroll-displaying the screens on the touch panel 110 and the touch panel 120 in synchronization, with reference to FIGS. 2A and 2B.

Here, the term "scroll-displaying" refers to moving a display item displayed in a screen in a given direction and redisplaying the display item at a new position in the screen. As such, "scroll-displaying" is, in other words, processing of successively changing the portion of data to be actually displayed (hereinafter referred to as a "data portion") within a data item which is the display target (hereinafter referred to as a "display target data item") and redisplaying different data portions on the touch panel one after another. Note that here, the display target data item refers to data having a comparatively great size, the entirety of which cannot be displayed at once in one screen.

Figure 2A:
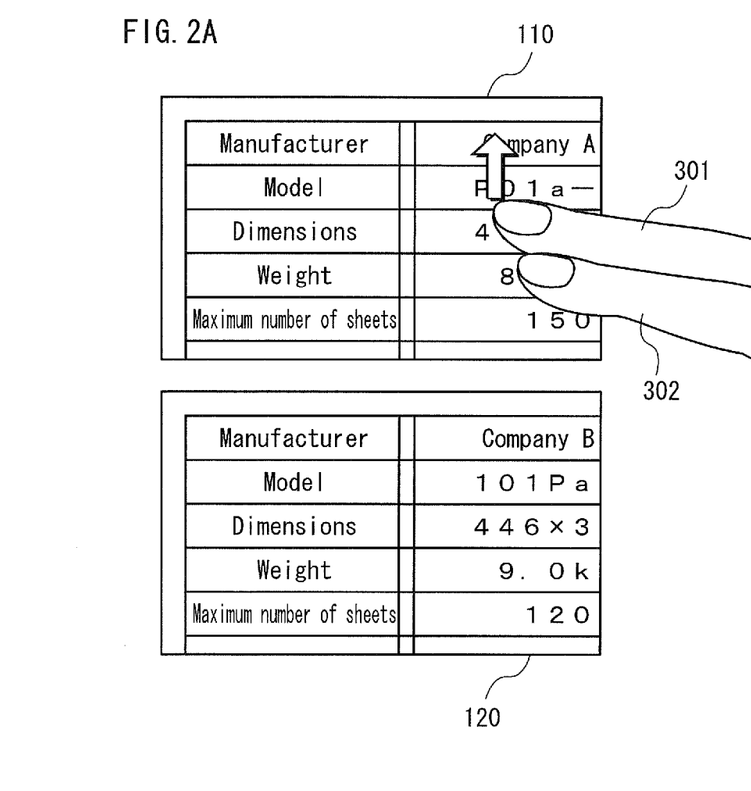
FIGS. 2A and 2B illustrate display examples of the mobile phone 100 and an example of a user operation performed with respect to the mobile phone 100.
Figure 2B:
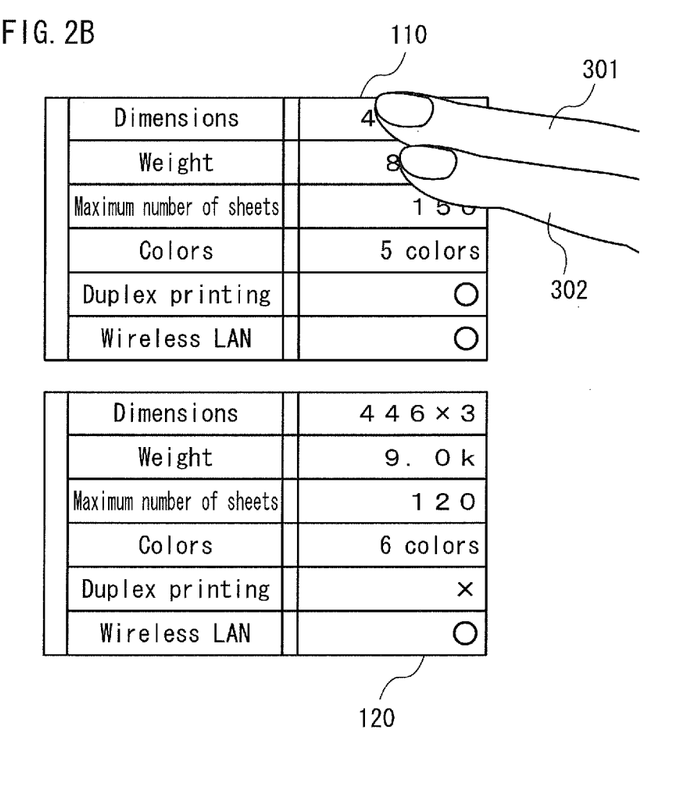

FIGS. 2A and 2B illustrate display examples of the mobile phone 100 and an example of a user operation performed with respect to the mobile phone 100.

In the example illustrated in FIGS. 2A and 2B, only examples of screens displayed on the mobile phone 100 are illustrated while illustration is omitted of the housings and the like of the mobile phone 100 for the sake of simplifying the description provided in the following.

In FIG. 2A, a portion of a corresponding table listing specifications of a printer (hereinafter referred to as a "specification table") is displayed on each of the touch panels 110 and 120. Note that the specification table displayed on the touch panel 110 and the specification table displayed on the touch panel 120 are different specification tables each listing specifications of a printer manufactured by a different manufacturer. In addition, in the illustration in FIG. 2A, a user is just about to perform a synchronized scroll operation on the touch panel 110.

Here, a "synchronized scroll operation" refers to a user operation where a user contacts one of the touch panels 110 and 120 by using two fingers or the like and moves the two fingers or the like in substantially parallel directions without releasing the contact made. In FIG. 2A, the user is contacting the touch panel 110 by using a middle finger 301 and an index finger 302. In addition, in FIG. 2A, the user is just about to move the middle finger 301 and the index finger 302 vertically upward in substantially parallel directions without releasing the contact made by using the middle finger 301 and the index finger 302.

As the user moves the points of contact (hereinafter referred to as "contact points") on the touch panel 110 corresponding to the middle finger 301 and the index finger 302 in substantially parallel directions from the respective positions illustrated in FIG. 2A to the respective positions illustrated in FIG. 2B without releasing the contact, the screens displayed on the touch panels 110 and 120 in FIG. 2A, in each of which a corresponding specification table is displayed, are scrolled in synchronization in accordance with the movement of the contact points. Accordingly, as illustrated in FIG. 2B, a screen including a column included in a relatively lower part of the corresponding specification table, which was not displayed in the corresponding screen illustrated in FIG. 2A, is displayed on each of the touch panels 110 and 120.

Here, note that when a user contacts one of the touch panels 110 and 120 by using one finger or the like and moves the one finger or the like without releasing the contact, the user can selectively scroll only the screen displayed on the contacted one of the touch panels 110 and 120.

<Functional Structure>

Figure 3:
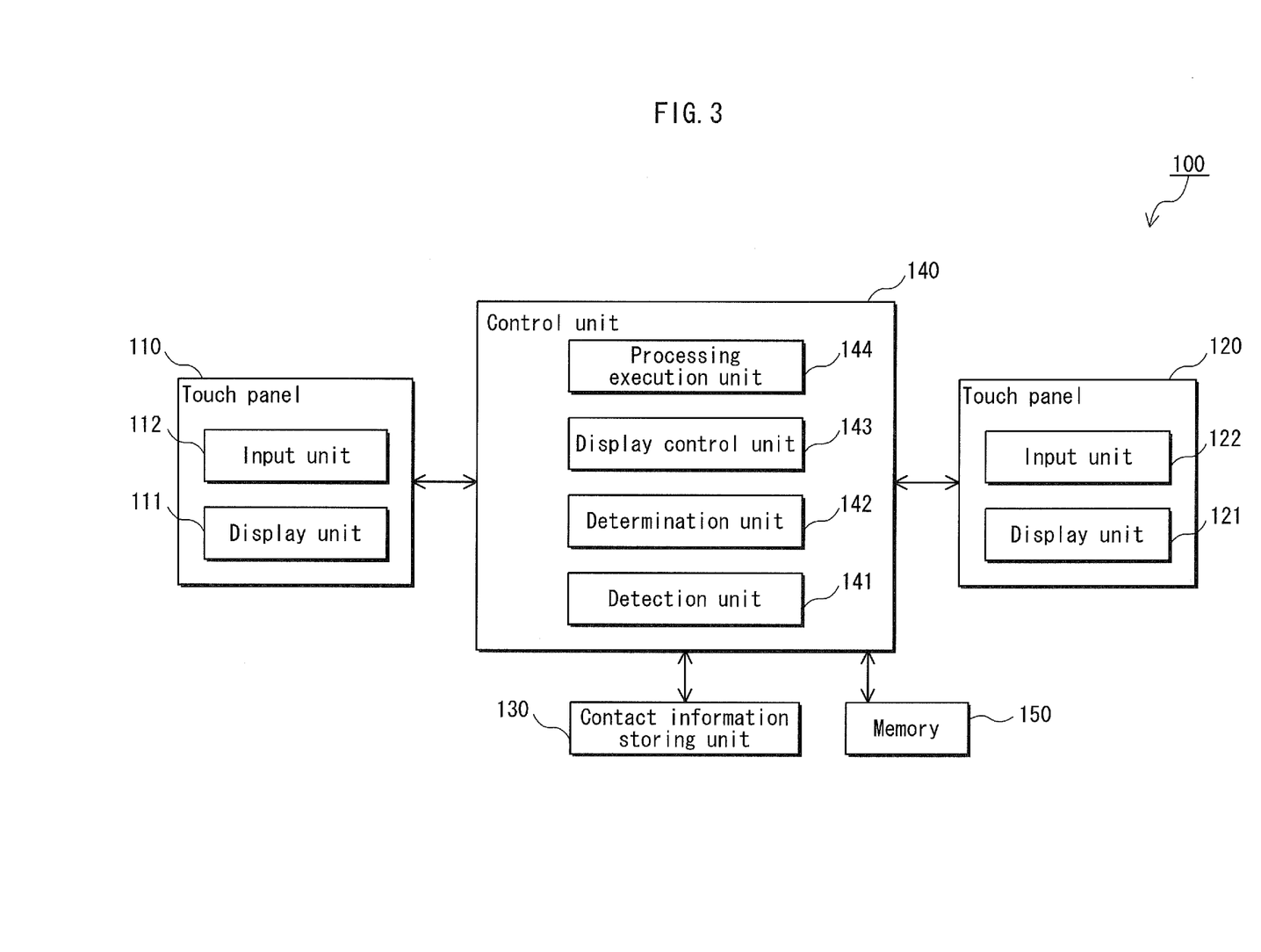
FIG. 3 is a block diagram illustrating a functional structure of main components of the mobile phone 100.

FIG. 3 is a block diagram illustrating a functional structure of main components of the mobile phone 100.

As illustrated in FIG. 3, the mobile phone 100 includes: the touch panels 110 and 120; a contact information storing unit 130; a control unit 140; and a memory 150.

In FIG. 3, illustration is omitted of components such as a communication unit provided to a typical mobile phone, and the speaker 7 and the microphone 8 illustrated in FIGS. 1A through 1C. In addition, the mobile phone 100 includes a processor and a memory, and each function of the control unit 140 is achieved by the processor executing a program stored in the memory.

The touch panel 110 includes a display unit 111 and an input unit 112. The touch panel 120 includes a display unit 121 and an input unit 122.

Each of the display units 111 and 121 includes an LCD (Liquid Crystal Display). Each of the display units 111 and 121 is a circuit for displaying images such as characters and icons on the corresponding LCD in accordance with instructions received from the control unit 140. Description is provided in the following based on the premise that the number of pixels of each LCD is 800×480 (width×height).

Each of the input units 112 and 122 is a circuit that is capable of detecting contact made by a user at two contact points on the corresponding one of the touch panels 110 and 120. Further, while detecting contact made by a user, one of the input units 112 and 122 corresponding to a contacted one of the touch panels 110 and 120 transmits, to the control unit 140, a coordinate value (x, y) for each contact point every time a unit time period (for instance, 25 ms) elapses. As such, one of the input units 112 and 122 corresponding to a contacted one of the touch panels 110 and 120 transmits two coordinate values when two contact points are detected and transmits one coordinate value when one contact point is detected.

Note that the description provided in the following is based on the premise that the coordinate value at a top left vertex of each of the touch panels 110 and 120 in FIG. 1C is (0, 0), and the coordinate value at a bottom right vertex of each of the touch panels 110 and 120 in FIG. 1C is (799, 479). In addition, each of the input units 112 and 122 is implemented by using, for instance, a projected capacitance touch sensor, which is one type of an electrostatic capacitive touch sensor. A projected capacitance touch sensor includes multiple electrode patterns formed on a substrate composed of plastic, glass, etc., and can detect a contact point by measuring ratios of amperages between different electrode patterns in the vicinity of the contact point.

The contact information storing unit 130 is a memory area for storing coordinate values transmitted from the input units 112 and 122. In specific, the memory area of the contact information storing unit 130 includes an area L1 for storing coordinate values transmitted from the input unit 112 and an area L2 for storing coordinate values transmitted from the input unit 122.

The control unit 140 includes: a detection unit 141; a determination unit 142; a display control unit 143; and a processing execution unit 144. The control unit 140 is provided with functions commonly provided to a mobile phone, and in addition to such common functions, the control unit 140 is particularly provided with a function of scroll-displaying screens on the touch panel 110 and the touch panel 120 in synchronization in accordance with a synchronized scroll operation performed by a user.

The detection unit 141 detects contact being made on the touch panels 110 and 120 and the release of contact being made on the touch panels 110 and 120. The detection unit 141 performs the detection of contact being made on one of the touch panels 110 and 120 according to whether or not a coordinate value is received from a corresponding one of the input units 112 and 122.

In addition, the detection unit 141 stores coordinate values received from the input units 112 and 122 to the contact information storing unit 130. In particular, when receiving a coordinate value from the input unit 112, the detection unit 141 stores the coordinate value to the area L1, and when receiving a coordinate value from the input unit 122, the detection unit 141 stores the coordinate value to the area L2.

In addition, the detection unit 141 manages, on the memory 150, information (hereinafter referred to as "detection count information") indicating whether one contact point or two contact points have been detected on a contacted one of the touch panels 110 and 120. More specifically, the detection unit 141 updates the detection count information so as to indicate "1" when one contact point has been detected on the contacted one of the touch panels 110 and 120 and so as to indicate "2" when two contact points have been detected on the contacted one of the touch panels 110 and 120. By referring to the detection count information, each of the components included in the control unit 140 is able to acknowledge that two contact points have been detected on the contacted one of the touch panels 110 and 120.

The determination unit 142 detects that a contact point corresponding to contact made to the contacted one of the touch panels 110 and 120 has moved. Further, the determination unit 142 calculates a movement amount of the contact point on the contacted one of the touch panels 110 and 120.

Further, particularly when detecting that two contact points corresponding to contact made to the contacted one of the touch panels 110 and 120 have moved, the determination unit 142 determines whether or not an amount of change in the relative position of one contact point with respect to the other contact point, before and after the movement of the two contact points, is smaller than a predetermined value.

The display control unit 143, in accordance with a synchronized scroll operation performed by a user, successively changes the data portion, in each display target data item, to be actually displayed on the corresponding one of the display units 111 and 121 and displays different data portions one after another on each of the display units 111 and 121.

It is to be noted that no dependency exists between a data portion displayed on the display unit 111 and a data portion displayed on the display unit 121. That is, a data portion displayed on one of the display units 111 and 121 is included in a different display target data item (for instance, a different data file) from the display target data item in which a data portion displayed on the other one of the display units 111 and 121 is included.

The display control unit 143 manages coordinate values (hereinafter referred to as "reference coordinate values"), each of which for specifying a data portion in the corresponding display target data item. In specific, the display control unit 143 updates the reference coordinate values according to the detection count information and the movement amount calculated by the determination unit 142.

In the following, description is provided on how the display control unit 143 specifies a data portion by using the reference coordinate value with reference to FIGS. 4 and 5.

Note that description is provided in the following taking as an example a case where specification is performed of data portions displayed on the display unit 111 of the touch panel 110 in the cases illustrated in FIGS. 2A and 2B. However, specification can be performed of data portions displayed on the display unit 121 of the touch panel 120 in the cases illustrated in FIGS. 2A and 2B in a similar manner.

Figure 4:
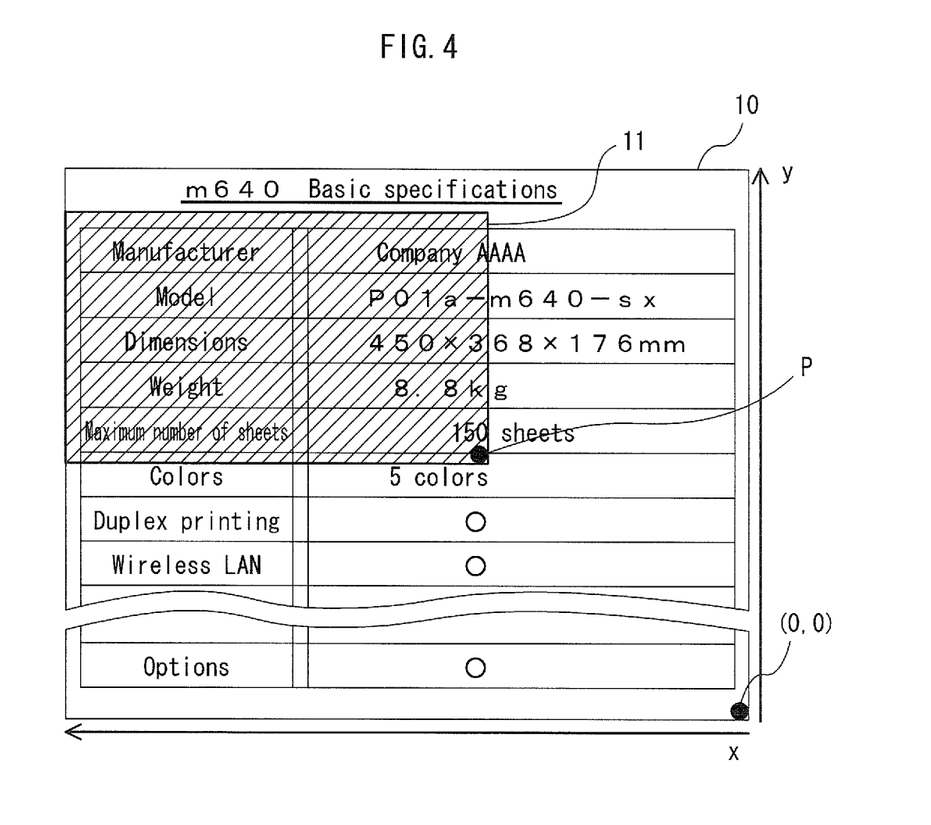
FIG. 4 illustrates a data portion 11 corresponding to a screen displayed on a display unit 111 of a touch panel 110 illustrated in FIG. 2A.

FIG. 4 illustrates a data portion 11 corresponding to the screen displayed on the display unit 111 of the touch panel 110 in FIG. 2A. FIG. 5 illustrates a data portion 12 corresponding to the screen displayed on the display unit 111 of the touch panel 110 in FIG. 2B.

As illustrated in FIG. 4, a reference coordinate value (indicated by using a symbol P in FIG. 4) is a coordinate value in a coordinate system in which a bottom right corner of a display target data item 10 is taken as an origin (0, 0), and an X axis is taken to be horizontal and a Y axis is taken to be vertical.

The display control unit 143 specifies, as the data portion 11, data (indicated by the hatched lines in FIG. 4) having a size of 800×480 originating from the reference coordinate value P, which is set as the origin. Further, the display control unit 143 causes the display unit 111 to display the partial data 11. As such, the screen including the portion of the specification table illustrated in FIG. 2A is displayed on the display unit 111.

Note that the size of the data portion 11 is equivalent to the size of a display region of the display unit 111.

As the user moves the contact points corresponding to the middle finger 301 and the index finger 302 in substantially parallel directions from the respective positions illustrated in FIG. 2A to the respective positions illustrated in FIG. 2B without releasing the contact, the display control unit 143 successively updates the reference coordinate value P in accordance with the movement amount of the contact points. As a result, when the contact points corresponding to the middle finger 301 and the index finger 302 have moved to the respective positions illustrated in FIG. 2B, the reference coordinate value P indicates the position illustrated in FIG. 5.

Figure 5:
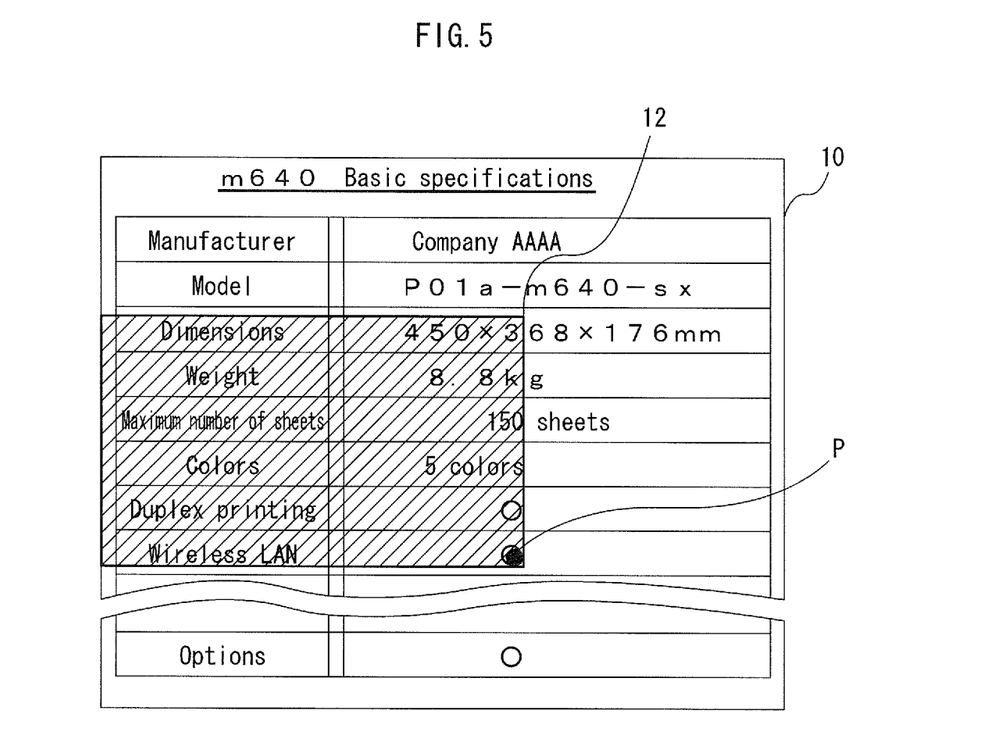
FIG. 5 illustrates a data portion 12 corresponding to a screen displayed on the display unit 111 of the touch panel 110 illustrated in FIG. 2B.

The display control unit 143 specifies the data portion 12 in the same manner as described above by using the reference coordinate value P illustrated in FIG. 5B as the origin. Further, the display control unit 143 causes the display unit 111 to display the data portion 12. As such, the screen including the portion of the specification table illustrated in FIG. 2B is displayed on the display unit 111.

Here, note that description is provided based on the premise that the display control unit 143 manages each display target data item (in this example, rendering data for an entirety of the corresponding specification table) in a corresponding area (hereinafter referred to as a "data area") on the memory 150.

Concerning the function of the processing execution unit 144, when one contact point is detected on one of the input units 112 and 122, the processing execution unit 144 executes processing corresponding to the contact point.

Here, the processing corresponding to the contact point is processing allocated to an object (an icon, a button, etc.) arranged at the contact point. Further, the processing execution unit 144 manages the sizes, shapes, and arrangement (coordinates) of the objects displayed on each of the display units 111 and 121.

In addition, the aforementioned memory 150 is a memory area for storing the detection count information and the display target data items.

<Operations>

Subsequently, description is provided on operations of the mobile phone 100 having the above-described structure with reference to FIG. 6.

Figure 6:
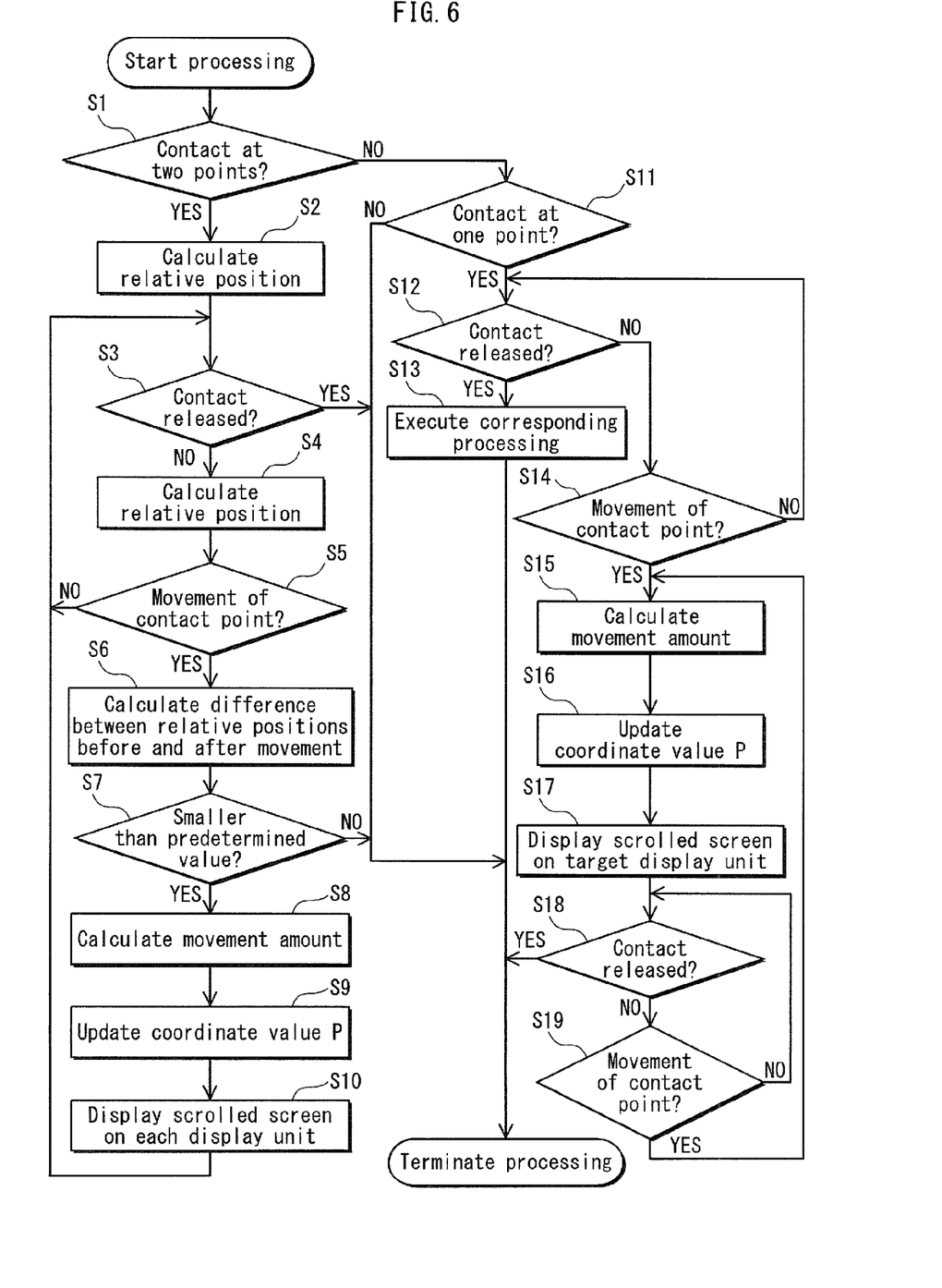
FIG. 6 is a flowchart illustrating control processing of the mobile phone 100.

FIG. 6 is a flowchart illustrating control processing of the mobile phone 100.

Note that the control processing illustrated in FIG. 6 is to be repeatedly executed.

As illustrated in FIG. 6, the detection unit 141 determines whether or not contact has been detected at two contact points on one of the touch panels 110 and 120 (Step S1). The detection in Step S1 is performed according to whether or not two coordinate values are received from one of the input units 112 and 122.

When two coordinate values are received from one of the input units 112 and 122, the detection unit 141 determines that two contact points have been detected on one of the touch panels 110 and 120 including the one of the input units 112 and 122 having transmitted the two coordinate values (Step S1: YES). Accordingly, the detection unit 141 stores the two coordinate values received from the one of the input units 112 and 122 in an associated state to an area of the contact information storing unit 130 (the area L1 or the area L2) corresponding to the one of the input units 112 and 122. At the same time, the detection unit 141 updates the detection count information so as to indicate "2".

In the description provided in the following, the one of the input units 112 and 122 having transmitted the two coordinate values received by the detection unit 141 is also referred to as the "target input unit". In addition, one of the areas L1 and L2 corresponding to the target input unit is also referred to as the "target area".

Subsequently, the determination unit 142 calculates a relative position of one contact point, among the two contact points detected in Step S1, with respect to the other contact point (Step S2). Here, the position of the other contact point is used as a reference point in determining the relative position of the one contact point.

Further, the other contact point that is used as the reference point for determining the relative position of the one contact point is the contact point having a smaller y coordinate among the two contact points detected in Step S1. Further, when the coordinate value of the other contact point that is used as the reference point is denoted as (xa, ya) and the coordinate value of the one contact point is denoted as (xb, yb), the relative position of the one contact point with respect to the other contact point is calculated as (xb−xa, yb−ya).

Subsequently, the detection unit 141 determines whether or not the contact having been detected at the two contact points a unit interval ago has been released according to whether or not two coordinate values are no longer received from the target input unit (Step S3). When two coordinate values are still being received at this point, the detection unit 141 determines that the contact made at the two contact points a unit interval ago has not been released (Step S3: NO) and stores the two coordinate values received at this point in an associated state to the target area (the area L1 or the area L2).

Following this, the determination unit 142 calculates a relative position of one contact point, among the two contact points detected in Step S3, with respect to the other contact point, similar as in Step S2 (Step S4). Here, the position of the other contact point is used as a reference point in determining the relative position of the one contact point, similar as in Step S2.

Subsequently, the determination unit 142 determines whether or not the two contact points detected in Step S3 have moved with respect to the two contact points having been detected a unit interval ago (Step S5). When the determination unit 142 determines that the two contact points detected in Step S3 have not moved with respect to the two contact points having been detected a unit interval ago (Step S5: NO), processing is commenced from Step S3 once again. On the other hand, when the determination unit 142 determines that the two contact points detected in Step S3 have moved with respect to the two contact points having been detected a unit interval ago (Step S5: YES), the determination unit 142 calculates a difference between the relative position calculated before the movement of the two contact points and the relative position calculated after the movement of the two contact points (Step S6).

Here, when the relative position calculated before the movement of the two contact points is denoted as (x1, y1) and the relative position calculated after the movement of the two contact points is denoted as (x2, y2), the difference between the relative positions before and after the movement of the two contact points can be calculated as (x2−x1, y2−y1).

Following the calculation of the difference between the relative positions before and after the movement of the two contact points, the determination unit 142 determines whether or not the difference between the relative positions so calculated satisfies both of the following two conditions: (i) whether or not the absolute value of the x component (x2−x1) of the calculated difference is smaller than a predetermined value Xth; and (ii) whether or not the absolute value of the y component (y2−y1) of the calculated difference is smaller than a predetermined value Yth (Step S7). When the determination unit 142 determines that the calculated difference does not satisfy the two conditions (Step S7: NO), the control unit 140 terminates the control processing. When determining that the calculated difference satisfies the two conditions (Step S7: YES), the determination unit 142 calculates the movement amount of the other contact point that has been used as the reference point, among the two contact points detected (Step S8). Note that description is provided in the following based on the premise that the above-described predetermined values Xth and Yth are each set to "10", as one example.

Here, when the coordinate value of the reference point (i.e., the other contact point) before the movement of the two contact points is denoted as (xa1, ya1) and the coordinate value of the reference point after the movement of the two contact points is denoted as (xa2, ya2), the movement amount of the reference point can be calculated as (xa2−xa1, ya2−ya1).

Since the detection count information indicates "2" in this case, the display control unit 143 adds the movement amount calculated in Step S8 to each of the reference coordinate values corresponding to the display units 111 and 121 (Step S9). Subsequently, the display control unit 143 obtains, from each data area, a data portion having a size of 800×480 originating from a position indicated by the corresponding reference coordinate value yielded as a result of the addition in Step S9. Further, the display control unit 143 displays each data portion so obtained on a corresponding one of the display units 111 and 121 (Step S10). By processing being performed as described above, a scrolled screen is displayed on each of the display units 111 and 121.

When the processing in Step S10 is completed, processing is commenced from Step S3 once again. In Step S3, when two coordinate values are no longer being received, the detection unit 141 determines that the contact having been detected at the two contact points a unit interval ago has been released (Step S3: YES). Accordingly, the control unit 140 terminates the control processing.

In the meantime, when two coordinate values are received from neither the input unit 112 or the input unit 122 in Step S1, the detection unit 141 determines that contact has not been detected at two contact points (Step S1: NO). In such a case, the detection unit 141 determines whether or not contact has been detected at one contact point on one of the touch panels 110 and 120 (Step S11). The detection in Step S11 is performed according to whether or not one coordinate value is received from one of the input units 112 and 122.

When a coordinate value is received neither from the input unit 112 nor the input unit 122, the detection unit 141 determines that no contact has been detected (Step S11: NO). Accordingly, the control unit 140 terminates the control processing. When one coordinate value is received from one of the input units 112 and 122, the detection unit 141 determines that one contact point has been detected on one of the touch panels 110 and 120 including the target input unit (Step S11: YES). Accordingly, the detection unit 141 stores the one coordinate value so received to the target area (the area L1 or the area L2). At the same time, the detection unit 141 updates the detection count information so as to indicate "1".

Subsequently, the detection unit 141 determines whether or not the contact having been detected at the one contact point a unit interval ago has been released according to whether or not one coordinate value is no longer received from the target input unit (Step S12). In Step S12, when one coordinate value is no longer being received, the detection unit 141 determines that the contact having been detected at the one contact point a unit interval ago has been released (Step S12: YES). Since the detection count information indicates "1" in this case, the processing execution unit 144 executes processing corresponding to the one contact point having been detected a unit interval ago. Accordingly, the display control unit 143 displays a screen indicating the results of the processing on each of the display units 111 and 121 (Step S13), and the control unit 140 terminates the control processing. Note that when an object such as an icon or the like is not arranged at the one contact point having been detected, and thus, there is no processing corresponding to the one contact point having been detected, the processing execution unit 144 and the display control unit 143 do not execute any processing in particular.

In Step S12, when one coordinate value is still being received, the detection unit 141 determines that the contact having been detected at the one contact point a unit interval ago has not been released (Step S12: NO) and stores the one coordinate value received at this point to the target area (the area L1 or the area L2).

Following this, the determination unit 142 determines whether or not the one contact point detected in Step S12 has moved with respect to the one contact point having been detected a unit interval ago (Step S14). When the determination unit 142 determines that the one contact point detected in Step S12 has not moved with respect to the one contact point having been detected a unit interval ago (Step S14: NO), processing is commenced from Step S12 once again. On the other hand, when the determination unit 142 determines that the one contact point detected in Step S12 has moved with respect to the one contact point having been detected a unit interval ago (Step S14: YES), the determination unit 142 calculates the movement amount of the one contact point similar as in Steps S8 and S9 above (Step S15). Since the detection count information indicates "1" in this case, the display control unit 143 adds the movement amount calculated in Step S15 to the reference coordinate value corresponding to one of the display units 111 and 121 (hereinafter referred to as the "target display unit") corresponding to the target input unit (Step S16).

Subsequently, the display control unit 143 obtains, from the corresponding data area, a data portion corresponding to the display region of the target display unit by using the reference coordinate value yielded as a result of the addition in Step S16 and displays the data portion so obtained on the target display unit (Step S17).

Subsequently, the detection unit 141 determines whether or not the contact having been detected at the one contact point a unit interval ago has been released, similar as in Step S12 (Step S18). When the detection unit 141 determines that the contact having been detected at the one contact point a unit interval ago has been released (Step S18: YES), the control unit 140 terminates the control processing. When the detection unit 141 determines that the contact detected at the one contact point a unit interval ago has not been released (Step S18: NO), the detection unit 141 stores the one coordinate value received at this point to the target area (the area L1 or the area L2).

Following this, the determination unit 142 determines whether or not the one contact point detected in Step S18 has moved with respect to the one contact point having been detected a unit interval ago, similar as in Step S14 (Step S19). When the determination unit 142 determines that the one contact point detected in Step S18 has moved with respect to the one contact point having been detected a unit interval ago (Step S19: YES), processing is commenced from Step S15 once again. When the determination unit 142 determines that the one contact point detected in Step S18 has not moved with respect to the one contact point having been detected a unit interval ago (Step S19: NO), processing is commenced from Step S18 once again.

<Specific Example>

In the following, description is provided on operations of the mobile phone 100 based on the specific example illustrated in FIGS. 2A and 2B and with reference to the flowchart illustrated in FIG. 6.

In specific, description is provided in the following taking as an example a case where a user (i) commences contact on the touch panel 110 by putting the middle finger 301 and the index finger 302 in contact with the touch panel 110 at the contact points illustrated in FIG. 2A and (ii) then releases the contact on the touch panel 110 by releasing the middle finger 301 and the index finger 302 from the touch panel 110 at the contact points illustrated in FIG. 2B. Note that the following description provided based on this example is based on the premise that the user performs a synchronous scroll operation along a linear path connecting the contact points illustrated in FIG. 2A and the contact points illustrated in FIG. 2B and such that the contact points move during each unit interval without exception.

In addition, description provided in the following is based on the premise that, at a time point corresponding to the beginning of the description provided in the following, the reference coordinate values corresponding to the display units 111 and 121 commonly indicate (450, 470).

When the user puts the middle finger 301 and the index finger 302 in contact with the touch panel 110 as illustrated in FIG. 2A, the detection unit 141 receives, from the input unit 112, two coordinate values corresponding to the two contact points. As description has been provided above, the two contact points correspond to the positions on the touch panel 110 contacted by the middle finger 301 and the index finger 302. When receiving two coordinate values from the input unit 112, the detection unit 141 determines that contact has been detected at two contact points on the touch panel 110 (Step S1: YES). Accordingly, the detection unit 141 stores the two coordinate values received from the input unit 112 in an associated state to the area L1. At the same time, the detection unit 141 updates the detection count information so as to indicate "2".

Note that the description provided in the following is based on the premise that, for instance, the coordinate value of the contact point corresponding to the middle finger 301 is (608, 245), and the coordinate value of the contact point on the touch panel 110 corresponding to the index finger 302 is (672, 362).

Subsequently, the determination unit 142 calculates a relative position (64, 117) of the contact point corresponding to the index finger 302 with respect to the contact point corresponding to the middle finger 301 (Step S2). Here, the position of the contact point corresponding to the middle finger 301, which has a smaller y coordinate among the two contact points, is used as a reference point for determining the relative position of the contact point corresponding to the index finger 302. Further, the detection unit 141 determines that the contact detected at the two contact points corresponding to the middle finger 301 and the index finger 302 has not been released (Step S3: NO) in this example. As such, the detection unit 141 stores the two coordinate values received at this point in an associated state to the area L1.

Note that the description provided in the following is based on the premise that, for instance, the coordinate value of the contact point corresponding to the middle finger 301 is (608, 178), and the coordinate value of the contact point corresponding to the index finger 302 is (672, 291).

Subsequently, the determination unit 142 calculates a relative position (64, 113) of the contact point corresponding to the index finger 302, among the two contact points at which contact has been detected in Step S3, with respect to the contact point corresponding to the middle finger 301 (Step S4). Here, the position of the contact point corresponding to the middle finger 301 is used as a reference point for determining the relative position of the contact point corresponding to the index finger 302. In this example, the determination unit 142 determines that the contact point corresponding to the middle finger 301 and the contact point corresponding to the index finger 302, at which contact has been detected in Step S3, have respectively moved with respect to the contact point corresponding to the middle finger 301 and the contact point corresponding to the index finger 302 at which contact was detected in Step S3 (Step S5: NO). Accordingly, the determination unit 142 calculates a difference (0, −4) between the relative position calculated before the movement of the two contact points and the relative position calculated after the movement of the two contact points (Step S6).

In this case, the determination unit 142 determines that the difference between the relative positions so calculated satisfies both of the two conditions described above (Step S7: YES). In specific, the absolute value (0) of the x component of the calculated difference is smaller than the predetermined value Xth (10, in this example), and the absolute value (4) of the y component of the calculated difference is smaller than the predetermined value Yth (10, in this example). Accordingly, the determination unit 142 calculates the movement amount (0, −67) of the contact point corresponding to the middle finger 301 that has been used as the reference point (Step S8).

Following this, the display control unit 143 adds the movement amount (0, −67) calculated in Step S8 to each of the reference coordinate values (450, 470) corresponding to the display units 111 and 121 (Step S9). Subsequently, the display control unit 143 obtains, from each data area, a data portion having a size of 800×480 originating from a position indicated by the corresponding reference coordinate value (450, 403) yielded as a result of the addition in Step S9. Further, the display control unit 143 displays each data portion so obtained on a corresponding one of the display units 111 and 121 (Step S10).

When the processing in Step S10 is completed, processing is commenced from Step S3 once again, and the processing in the above-described Steps S3 through S10 is performed repeatedly until the user releases the contact on the touch panel 110 by releasing the middle finger 301 and the index finger at the contact points illustrated in FIG. 2B. By processing being performed in such a manner, a scrolled screen is displayed on each of the display units 111 and 121.

Once the user releases the contact on the touch panel 110 by releasing the middle finger 301 and the index finger 302 from the touch panel 110, the detection unit 141 no longer receives two coordinate values from the input unit 112, which is the target input unit. Accordingly, the detection unit 141 determines that the contact detected at two contact points has been released (Step S3: YES). Accordingly, the control unit 140 terminates the control processing.

<<Supplement>>

Although description has been provided in the above on the portable terminal pertaining to the present invention based on one embodiment thereof, it is to be understood that the present invention is not limited to the mobile phone as description has been made in the embodiment, and modifications as introduced below can be made without departing from the spirit and scope thereof.

(1) In the embodiment, description is provided that the mobile phone 100 including two touch panels, namely the touch panels 110 and 120, performs scroll-displaying of the screens displayed on the display units 111 and 112 in synchronization when a user performs a synchronous scroll operation on one of the touch panels 110 and 120. That is, description is provided in the embodiment that the mobile phone 100 performs scroll-displaying in synchronization regardless of which of the touch panels 110 and 120 receives the synchronous scroll operation. However, the present invention is not limited to this, and the portable terminal pertaining to the present invention may be provided with one touch panel for receiving a synchronous scroll operation from a user and one display unit (display).

(2) In the embodiment, scroll-displaying is performed such that a display item displayed at the position indicated by the middle finger 301 in FIG. 2A moves to the position indicated by the middle finger 301 in FIG. 2B, which has moved with respect to the middle finger 301 illustrated in FIG. 2A. However, the present invention is not limited to this, and the scroll amount when scroll-displaying is performed may be smaller or greater than in the above-described case. Alternatively, modification may be performed such that the user is able to set the scroll amount.

In addition, description is provided in the embodiment that the scroll amount is determined according to the movement amount of the contact point that has been used as the reference point. However, the present invention is not limited to this, and the scroll amount may be determined by using the movement amounts of two contact points at which contact is detected. That is, the scroll amount may be determined according to, for instance, an average value of the movement amounts of two contact points at which contact is detected.

(3) In the embodiment, description is provided on a synchronized scroll operation by taking as an example a case where the middle finger 301 and the index finger 302 are moved vertically upward as illustrated in FIG. 2A. However, the present invention is not limited to this, and as a matter of course, a synchronized scroll operation may be a user operation of moving the middle finger 301 and the index finger 302 (i) vertically downward, (ii) horizontally, or (iii) diagonally.

In addition, according to the control processing illustrated in FIG. 6, when the user moves the middle finger 301 and the index finger 302 diagonally, in an upper left direction for instance, in performing a synchronized scroll operation, the position of the data portion in the display target data item moves in a bottom right direction (in a direction approaching the origin (0, 0) in both the X axis direction and the Y axis direction). However, the present invention is not limited to this, and modification may be performed such that, in the above-described case, the position of the data portion in the display target data item moves in a direction opposite the direction (the left direction or the upper direction) in which the user's fingers move by a comparatively great amount. That is, modification may be performed such that, as a user moves the middle finger 301 and the index finger 302 in the diagonal direction, the position of the data portion in the display target data item moves in one of a vertical direction or a horizontal direction that corresponds to the direction in which the user's fingers move by a greater amount compared to the other direction.

(4) In the embodiment, description is provided that the LCDs included in the input units 112 and 122 have the same number of pixels. Further, description is provided in the embodiment under the premise that the LCDs have substantially rectangular shapes. However, the LCDs may be provided with a different number of pixels and may have other shapes such as a circular shape and a polygonal shape. When modification is performed of the number of pixels provided to the LCDs or the shapes of the LCDs as described above, the shapes and the sizes of the data portions in the display target data items are to be modified in accordance with such modifications.

(5) In the embodiment, description is provided based on the premise that every display item displayed on the touch panels 110 and 120 is caused to move to a new display position when a synchronized scroll operation is performed. However, the present invention is not limited to this, and data items (hereinafter referred to as "fixed display items") that do not move even when a synchronized scroll operation is performed may exist. So as to realize the displaying of such fixed display items on the touch panels 110 and 120, the rendering data for the fixed display items and arrangement information for the fixed display items (information concerning the display unit on which each fixed display item is to be displayed and coordinates of each fixed display item) may be managed separately, and when displaying of the obtained data portions on the display units 111 and 121 is performed in Step S10 illustrated in FIG. 6, the fixed display items may be rendered so as to be overlaid on top of the data portions.

(6) In the embodiment, description is provided that the data item which is the display target (the display target data item) is generated in advance, and that scroll-displaying is realized by causing each of the display units 111 and 121 to successively change the portion of data to be actually displayed (data portion) included in the corresponding display target data item and to redisplay the data portions on the touch panel one after another. However, the present invention is not limited to this, and a conventional method for realizing scroll-displaying may be utilized. That is, the display target data item need not be generated in advance, and each of the display units 111 and 121 may be caused to display data portions that are generated one after another in accordance with a synchronized scroll operation performed by a user.

(7) In the embodiment, description is provided that the mobile phone 100 pertaining to the embodiment is a slide-type mobile phone. However, the present invention is not limited to this, and the portable terminal pertaining to the present invention may be a mobile phone having a different external appearance. For instance, the portable terminal pertaining to the present invention may be a flip-type mobile phone 200 as illustrated in FIGS. 7A through 7C.

The mobile phone 200 includes a first housing 201 and a second housing 202 that are joined in a mutually openable state. The first housing 201 includes a touch panel 210. The second housing 202 includes a touch panel 220.

Figure 7A:
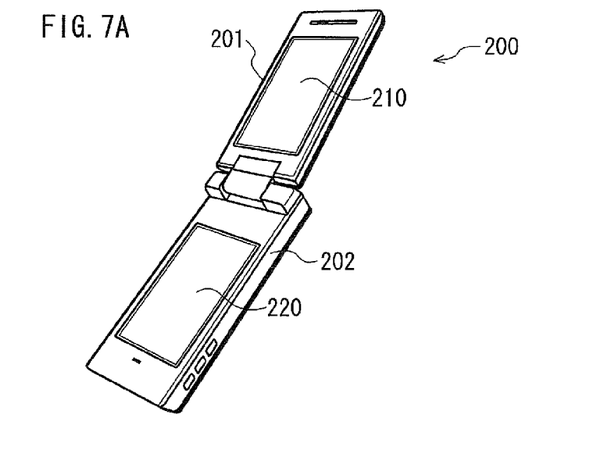
FIGS. 7A and 7B each show an external appearance of a mobile phone 200 in an open state thereof.
Figure 7B:
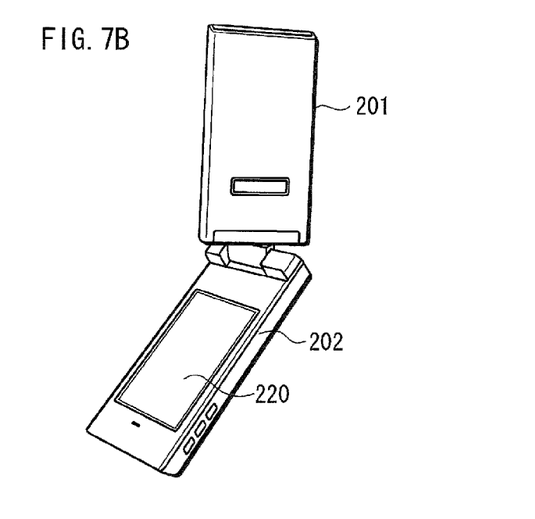
Figure 7C:
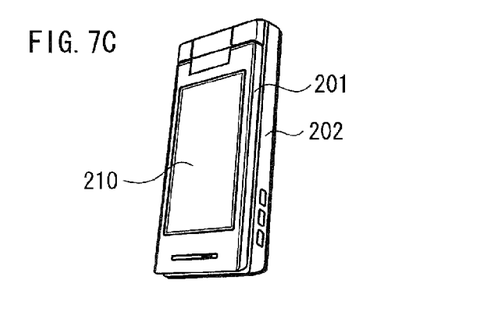
FIG. 7C shows an external appearance of the mobile phone 200 in a closed state thereof.

As illustrated in FIG. 7A, when the mobile phone 200 is in an open state, both touch panels can be seen from the outside as the first housing 201 and the second housing 202 are mutually open. By rotating the first housing 201 180 degrees with respect to the second housing 202 and then mutually closing the first housing 201 and the second housing 202, as illustrated in FIGS. 7B and 7C, the mobile phone 200 is switched to a closed state in which the touch panel 220 included in the second housing 202 is placed behind the first housing 201 and thus only the touch panel 210 included in the first housing 201 can be seen from the outside.

In this modification and in the embodiment, description is provided on a transformable mobile phone whose shape can be changed by opening/closing the mobile phone. However, the present invention is also applicable to a non-transformable mobile phone, such as a bar-type mobile phone, whose shape cannot be changed by opening/closing the mobile phone.

(8) In the embodiment, description is provided that each of the input units 112 and 122 respectively included in the touch panels 110 and 120 pertaining to the embodiment is implemented by using a projected capacitance touch sensor, which is one type of an electrostatic capacitive touch sensor. However, the present invention is not limited to this. Alternatively, the input units included in the touch panels may each be embodied as: an electromagnetic induction touch sensor, a matrix switch touch sensor, a resistive touch sensor, a surface acoustic wave touch sensor, an infrared touch sensor, an optical sensor touch sensor or the like. In further explanation of each of the types of the touch sensors, an electromagnetic induction touch sensor requires the use of a special pen such as an electronic pen, a matrix switch touch sensor is composed of transparent electrodes having two-layer structures, a resistive touch sensor includes two resistive layers and voltage is applied to one resistive layer and the other resistive layer detects changes in voltage according to locations on the one resistive layer to which contact has been made, a surface acoustic wave touch sensor detects contact made by a finger or the like by detecting the reflection of ultrasonic waves by monitoring the voltage changes of piezoelectric elements, an infrared touch sensor detects a location thereof to which contact has been made by a finger or the like by using shielded infrared beams, and an optical sensor touch sensor detects a location thereof to which contact has been made by using an optical sensor provided to the screen.

(9) In the embodiment, description is provided that, in a normal usage state of the mobile phone 100 pertaining to the embodiment, the touch panels 110 and 120 lie in approximately the same plane and are arranged vertically when viewed from a user. However, the present invention is not limited to this, and the touch panels 110 and 120 may be arranged horizontally.

Additionally, in the embodiment, description is provided that, in the open state of the mobile phone 100 pertaining to the embodiment illustrated in FIG. 1C, the touch panels 110 and 120 lie in approximately the same plane. However, the present invention is not limited to this, and the arrangement of the touch panels 110 and 120 when the mobile phone 100 is in the open state may be any arrangement provided that both of the touch panels 110 and 120 can be seen from the outside.

For instance, in the open state, the touch panels 110 and 120 may be arranged such that: a surface of the first housing 1 that includes the display panel 111 of the touch panel 110 is approximately parallel to a surface of the second housing 2 that includes the display panel 121 of the touch panel 120; or the surface of the first housing 1 that includes the display panel 111 of the touch panel 110 is angled relative to the surface of the second housing 2 that includes the display panel 121 of the touch panel 120 to a certain extent such that both of the touch panels 110 and 120 can be seen from the outside.

(10) In the embodiment, description is provided taking as an example a case where the predetermined value Xth and the predetermined value Yth used in the determination in Step S7 illustrated in FIG. 6 are commonly set to "10". However, the present invention is not limited to this example, and the predetermined values Xth and Yth may be set to a common value greater or smaller than "10". Further, the predetermined values Xth and Yth may be set so as to have different values. In addition, modification may be performed such that a user is able to set desired values to the predetermined values Xth and Yth.

In addition, modification may be performed such that the predetermined values Xth and Yth are set according to a result of a synchronized scroll operation that a user is urged to perform when initially using the mobile phone 100 pertaining to the embodiment.

(11) The components explanation of which has been provided in the embodiment may be partially or entirely embodied as an integrated circuit having one chip or multiple chips. Further, the components may also be embodied as a computer program or as any type of embodiment.

Further, the components explanation of which has been provided in the embodiments operate in a cooperative manner with the processor included in the mobile phone, and thus, realize the functions provided thereto.

(12) A program for causing a CPU (Central Processing Unit) to execute the processing (refer to FIG. 6) performed in response to input received by the touch panels as explanation has been made in the embodiment may be distributed by recording the program onto recording media, or by transmitting the program via various communication paths. Such recording media include IC cards, optical discs, flexible disks, ROMs, flash memories, and the like. The distributed program is to be stored to a memory or the like which may be read by the CPU provided to devices, so that the CPU may access and execute the program. Thereby, each of the functions of the mobile phone explanation of which has been provided in the embodiment is to be realized.

(13) The modifications described in (1) through (12) above may be partially or entirely applied in combination with the mobile phone pertaining to the embodiment.

(14) In the following, explanation is provided of a structure of a portable terminal pertaining to one embodiment of the present invention as well as of modifications thereof. Additionally, explanation is provided of advantageous effects yielded by such portable terminals.

(a) A portable terminal pertaining to one aspect of the present invention is a portable terminal that comprises: a display configured to display a display item; a touch panel configured to display a display item and to detect contact made thereon; a detection unit configured to detect a first contact point and a second contact point at different positions on the touch panel; a determination unit configured to, when the detection unit detects the first contact point and the second contact point, determine whether or not the first contact point moves before release of at least one of the first contact point and the second contact point, and further determine, only when determining that the first contact point has moved before release of at least one of the first contact point and the second contact point, whether or not a change in a relative position of the second contact point with respect to the first contact point, before and after the movement of the first contact point, is smaller than a predetermined amount; and a display control unit configured to, when the determination unit determines that the change in the relative position of the second contact point with respect to the first contact point, before and after the movement of the first contact point, is smaller than the predetermined amount, specify, according to a direction of the movement of the first contact point, a position on the display to which a first display item is to be moved and a position on the touch panel to which a second display item is to be moved, the first display item being displayed on the display prior to the movement of the first contact point and the second display item being displayed on the touch panel prior to the movement of the first contact point, and display the first display item at the position on the display to which the first display item is to be moved and display the second display item at the position on the touch panel to which the second display item is to be moved.

According to the above-described structure of the portable terminal pertaining to one aspect of the present invention, a user can cause the respective display items displayed on the display and the touch panel to be moved and displayed just by performing a predetermined operation with respect to the touch panel by using two fingers or the like. In other words, the user is able to cause the respective display items displayed on the display and the touch panel to be scroll-displayed in synchronization. As such, the burden placed upon the user is reduced compared to a case where the user is required to perform a scroll operation separately with respect to the display and the touch panel to realize scroll-displaying of the respective data items.

In addition, since the user is able to cause the respective display items separately displayed on the display and the touch panel to be scroll-displayed in synchronization by performing an operation by using two fingers or the like, the portable terminal pertaining to one aspect of the present invention realizes easy and intuitive operation.

(b) In the portable terminal pertaining to one aspect of the present invention, the detection unit may repeatedly detect the first contact point and the second contact point, each time the detection unit detects the first contact point and the second contact point, the determination unit may determine whether or not the first position moves before release of at least one of the first contact point and the second contact point and may further determines, only when determining that the first contact point has moved before release of at least one of the first contact point and the second contact point, whether or not the change in the relative position of the second contact point with respect to the first contact point, before and after the movement of the first point, is smaller than the predetermined amount, and each time the determination unit determines that the change in the relative position of the second contact point with respect to the first contact point, before and after the movement of the first contact point, is smaller than the predetermined amount, the display control unit may specify, in accordance with the direction of the movement of the first contact point, the position on the display to which the first display item is to be moved and the position on the touch panel to which the second display item is to be moved and may display the first display item at the position on the display to which the first display item is to be moved and display the second display item at the position on the touch panel to which the second display item is to be moved.

According to the above-described structure of the portable terminal pertaining to one aspect of the present invention, a subsequent display position of each of the display items is repeatedly specified while the two fingers or the like put into contact with the touch panel are moved such that the change in the relative position between the two fingers or the like does not exceed the predetermined amount. As such, the first display item displayed on the display and the second display item displayed on the touch panel can be scroll-displayed in synchronization by moving the two fingers or the like in the above-described manner.

(c) In the portable terminal pertaining to one aspect of the present invention, each time the determination unit determines that the change in the relative position of the second contact point with respect to the first contact point, before and after the movement of the first contact point, is smaller than the predetermined amount, the display control unit may specify the position on the display to which the first display item is to be moved and the position on the touch panel to which the second display item is to be moved in accordance with an amount of the movement of the first contact point in addition to the direction of the movement of the first contact point.

According to the above-described structure of the portable terminal pertaining to one aspect of the present invention, when the two fingers or the like put into contact with the touch panel are moved such that the change in the relative position between the two fingers or the like does not exceed the predetermined amount, a subsequent display position of each of the display items is specified according to a movement amount of a contact point corresponding to one of the fingers. As such, the scroll amount for scrolling the first display item displayed on the display and the second display item displayed on the touch panel can be controlled in accordance with the movement amount of one of the fingers.

(d) In the portable terminal pertaining to one aspect of the present invention, the display control unit may specify the position on the display to which the first display item is to be moved and the position on the touch panel to which the second display item is to be moved such that (i) a relative position of the position on the display to which the first display item is to be moved with respect to a position on the display at which the first display item is displayed prior to the specification is similar to (ii) a relative position of the position on the touch panel to which the second display item is to be moved with respect to a position on the touch panel at which the second display item is displayed prior to the specification.

According to the above-described structure of the portable terminal pertaining to one aspect of the present invention, when the two fingers or the like put into contact with the touch panel are moved such that the change in the relative position between the two fingers or the like does not exceed the predetermined amount, the specification of the subsequent display positions of the respective display items is performed such that a relative position of the display position of one display item after the specification with respect to the display position of the display item before the specification is similar to a relative position of the display position of the other display item after the specification with respect to the display position of the other display item before the specification. As such, the first display item displayed on the display and the second display item displayed on the touch panel can be scrolled at the same speed.

(e) In the portable terminal pertaining to one aspect of the present invention, no dependency may exist between a display item displayed on the display and a display item displayed on the touch panel.

When no dependency exists between a display item displayed on the display (the first display item) and a display item displayed on the touch panel (the second display item), the display target data item including the first display item and the display target data item including the second display item are different data items that are separate from each other. In other words, the first display item and the second display item do not compose a single display target data item.

As such, the portable terminal pertaining to one aspect of the present invention can realize scroll-displaying of the first display item and the second display item, which are included in different display target data items, in synchronization.

(f) In the portable terminal pertaining to one aspect of the present invention, the detection unit may be further configured to detect a contact point even when contact is made with respect to a single position on the touch panel, the determination unit may be further configured to determine, when the detection unit detects the contact point, whether or not the contact point moves before release of the contact point, and the display control unit may be further configured to, when the determination unit determines that the contact point has moved before release of the contact point, specify, according to a direction of the movement of the contact point, the position on the touch panel to which the second display item is to be moved without specifying the position on the display to which the first display item is to be moved, and display the second display item at the position on the touch panel to which the second display item is to be moved.

According to the above-described structure of the portable terminal pertaining to one aspect of the present invention, a user can cause only the first display item displayed on the touch panel to be scroll-displayed by performing an operation of contacting only one position on the touch panel by using one finger or the like and moving the one finger or the like without releasing the contact. As such, the user is able to choose whether (i) to cause the first display item displayed on the display and the second display item displayed on the touch panel to be scroll-displayed in synchronization or (ii) to cause only the first display item displayed on the touch panel to be scroll-displayed, by changing the number of the fingers or the like put into contact with the touch panel.

(g) The portable terminal pertaining to one aspect of the present invention may further comprise a touch sensor configured to detect contact made on a display surface of the display, the first display item displayed on the display surface, wherein the detection unit may be further configured to detect a third contact point and a fourth contact point at different positions on the touch sensor, the determination unit may be further configured to, when the detection unit detects the third contact point and the fourth contact point, determine, whether or not one of the third contact point and the fourth contact point moves before release of at least one of the third contact point and the fourth contact point and further determine, only when determining that one of the third contact point and the fourth contact point has moved before release of at least one of the third contact point and the fourth contact point, whether or not a change in a relative position of the fourth contact point with respect to the third contact point, before and after the movement of the one of the third contact point and the fourth contact point, is smaller than another predetermined amount, and the display control unit may be further configured to, when the determination unit determines that the change in the relative position of the fourth contact point with respect to the third contact point, before and after the movement of the one of the third contact point and the fourth contact point, is smaller than the other predetermined amount, specify, in accordance with a direction of the movement of the one of the third contact point and the fourth contact point, the position on the display to which the first display item is to be moved and the position on the touch panel to which the second display item is to be moved, and display the first display item at the position on the display to which the first display item is to be moved and display the second display item at the position on the touch panel to which the second display item is to be moved.

According to the above-described structure of the portable terminal pertaining to one aspect of the present invention, a user can also cause the first display item displayed on the display and the second display item displayed on the touch panel to be scroll-displayed in synchronization when performing an operation of putting two fingers or the like into contact with the touch sensor and moving the two fingers or the like such that the change in the relative position between the two fingers or the like does not exceed the predetermined amount, in addition to when performing a similar operation on the touch panel.

(15) The touch panel and the combination of the display and the touch sensor of the portable terminal pertaining to one aspect of the present invention each correspond to one of the touch panels 110 and 120 included in the mobile phone 100 pertaining to the embodiment. In addition, the combination of the detection unit, the determination unit, and the display control unit of the portable terminal pertaining to one aspect of the present invention corresponds to the control unit 140 included in the mobile phone 100 pertaining to the embodiment.

(16) The display control method pertaining to one aspect of the present invention is realized, for instance, by the mobile phone 100 in the embodiment (particularly refer to the control processing procedures explained with reference to FIG. 6).

INDUSTRIAL APPLICABILITY

The portable terminal pertaining to the present invention is applicable to a case where a user performs user operations by using a touch panel provided to a portable terminal.

REFERENCE SIGNS LIST

1, 201 first housing
2, 202 second housing
4, 4' coupling mechanism
5 coupling piece
6 guide groove
7 speaker
8 microphone
30, 30', 31, 31' pin
100, 200 mobile phone
110, 120, 210, 220 touch panel
111, 121 display unit
112, 122 input unit
130 contact information storing unit
140 control unit
141 detection unit
142 determination unit
143 display control unit
144 processing execution unit
150 memory

The invention claimed is:

1. A portable terminal comprising: a display configured to display a display item; a touch panel configured to display a display item and to detect contact made thereon; a detection unit configured to detect a first contact point and a second contact point at different positions on the touch panel; a determination unit configured to, when the detection unit detects the first contact point and the second contact point, determine whether or not the first contact point moves before release of at least one of the first contact point and the second contact point, and further determine, only when determining that the first contact point has moved before release of at least one of the first contact point and the second contact point, whether or not a change in a relative position of the second contact point with respect to the first contact point, before the movement of the first contact point is smaller than a predetermined amount and after the movement of the first contact point is smaller than a predetermined amount; and a display control unit configured to, when the determination unit determines that the change in the relative position of the second contact point with respect to the first contact point, before and after the movement of the first contact point, is smaller than the predetermined amount, specify, according to a direction of the movement of the first contact point, a position on the display to which a first display item is to be moved and a position on the touch panel to which a second display item is to be moved, the first display item being displayed on the display prior to the movement of the first contact point and the second display item being displayed on the touch panel prior to the movement of the first contact point, and display the first display item at the position on the display to which the first display item is to be moved and display the second display item at the position on the touch panel to which the second display item is to be moved.

2. The portable terminal of claim 1, wherein the detection unit repeatedly detects the first contact point and the second contact point, each time the detection unit detects the first contact point and the second contact point, the determination unit determines whether or not the first contact point moves before release of at least one of the first contact point and the second contact point and further determines, only when determining that the first contact point has moved before release of at least one of the first contact point and the second contact point, whether or not the change in the relative position of the second contact point with respect to the first contact point, before the movement for the first contact point is smaller than the predetermined amount and after the movement of the first contact point is smaller than the predetermined amount, and each time the determination unit determines that the change in the relative position of the second contact point with respect to the first contact point, before the movement of the first contact point is smaller than the predetermined amount and after the movement of the first contact point is smaller than the predetermined amount, the display control unit specifies, in accordance with the direction of the movement of the first contact point, the position on the display to which the first display item is to be moved and the position on the touch panel to which the second display item is to be moved and displays the first display item at the position on the display to which the first display item is to be moved and displays the second display item at the position on the touch panel to which the second display item is to be moved.

3. The portable terminal of claim 2, wherein each time the determination unit determines that the change in the relative position of the second contact point with respect to the first contact point, before the movement of the contact point is smaller than the predetermined amount and after the movement of the first contact point is smaller than the predetermined amount, the display control unit specifies the position on the display to which the first display item is to be moved and the position on the touch panel to which the second display item is to be moved in accordance with an amount of the movement of the first contact point in addition to the direction of the movement of the first contact point.

4. The portable terminal of claim 3, wherein the display control unit specifies the position on the display to which the first display item is to be moved and the position on the touch panel to which the second display item is to be moved such that (i) a relative position of the position on the display to which the first display item is to be moved with respect to a position on the display at which the first display item is displayed prior to the specification is similar to (ii) a relative position of the position on the touch panel to which the second display item is to be moved with respect to a position on the touch panel at which the second display item is displayed prior to the specification.

5. The portable terminal of claim 3, wherein no dependency exists between a display item displayed on the display and a display item displayed on the touch panel.

6. The portable terminal of claim 1, wherein the detection unit is further configured to detect a contact point even when contact is made with respect to a single position on the touch panel, the determination unit is further configured to determine, when the detection unit detects the contact point, whether or not the contact point moves before release of the contact point, and the display control unit is further configured to, when the determination unit determines that the contact point has moved before release of the contact point, specify, according to a direction of the movement of the contact point, the position on the touch panel to which the second display item is to be moved without specifying the position on the display to which the first display item is to be moved, and display the second display item at the position on the touch panel to which the second display item is to be moved.

7. The portable terminal of claim 1 further comprising a touch sensor configured to detect contact made on a display surface of the display, the first display item displayed on the display surface, wherein the detection unit is further configured to detect a third contact point and a fourth contact point at different positions on the touch sensor, the determination unit is further configured to, when the detection unit detects the third contact point and the fourth contact point, determine, whether or not one of the third contact point and the fourth contact point moves before release of at least one of the third contact point and the fourth contact point and further determine, only when determining that one of the third contact point and the fourth contact point has moved before release of at least one of the third contact point and the fourth contact point, whether or not a change in a relative of the fourth contact point with respect to the third contact point, before the movement of the once of the third contact point and the fourth contact point is smaller than another predetermined amount and after the movement of the one of the third contact point and the fourth contact point is smaller than another predetermined amount, and the display control unit is further configured to, when the determination unit determines that the change in the relative position of the fourth contact point with respect to the third contact point, before the movement of the one of the third contact point and the fourth contact point is smaller than the other predetermined amount and after the movement of the one of the third contact point and the fourth contact point is smaller than the other predetermined amount, specify, in accordance with a direction of the movement of the one of the third contact point and the fourth contact point, the position on the display to which the first display item is to be moved and the position on the touch panel to which the second display item is to be moved, and display the first display item at the position on the display to which the first display item is to be moved and display the second display item at the position on the touch panel to which the second display item is to be moved.

8. A non-transitory display control program that is used in a portable terminal having a display that displays a display item and a touch panel that displays a display item and detects contact made thereon, the non-transitory display control program comprising: a detection step of detecting a first contact point and a second contact point at different positions on the touch panel; a determination step of, when the detection step detects the first contact point and the second contact point, determining whether or not the first contact point moves before release of at least one of the first contact point and the second contact point, and further determining, only when determining that the first contact point has moved before release of at least one of the first contact point and the second contact point, whether or not a change in a relative position of the second contact point with respect to the first contact point, before the movement of the first contact point is smaller than a predetermined amount and after the movement of the first contact point is smaller than a predetermined amount; and a display control step of, when the determination step determines that the change in the relative position of the second contact point with respect to the first contact point, before the movement of the first contact point is smaller than the predetermined amount and after the movement of the first contact point is smaller than the predetermined amount, specifying, according to a direction of the movement of the first contact point, a position on the display to which a first display item is to be moved and a position on the touch panel to which a second display item is to be moved, the first display item being displayed on the display prior to the movement of the first contact point and the second display item being displayed on the touch panel prior to the movement of the first contact point, and displaying the first display item at the position on the display to which the first display item is to be moved and display the second display item at the position on the touch panel to which the second display item is to be moved.

9. A display control method for a portable terminal having a display that displays a display item and a touch panel that displays a display item and detects contact made thereon, the display control method comprising: a detection step of detecting a first contact point and a second contact point at different positions on the touch panel; a determination step of, when the detection step detects the first contact point and the second contact point, determining whether or not the first contact point moves before release of at least one of the first contact point and the second contact point, and further determining, only when determining that the first contact point has moved before release of at least one of the first contact point and the second contact point, whether or not a change in a relative position of the second contact point with respect to the first contact point, before the movement of the first contact point is smaller than a predetermined amount and after the movement of the first contact point is smaller than a predetermined amount; and a display control step of, when the determination step determines that the change in the relative position of the second contact point with respect to the first contact point, before the movement of the first contact point is smaller than the predetermined amount and after the movement of the first contact point is smaller than the predetermined amount, specifying, according to a direction of the movement of the first contact point, a position on the display to which a first display item is to be moved and a position on the touch panel to which a second display item is to be moved, the first display item being displayed on the display prior to the movement of the first contact point and the second display item being displayed on the touch panel prior to the movement of the first contact point, and displaying the first display item at the position on the display to which the first display item is to be moved and display the second display item at the position on the touch panel to which the second display item is to be moved.

* * * * *